March 25, 1958 J. E. PANZA ET AL 2,828,075
SAFETY MIXING VALVE FOR HOT AND COLD WATER
Filed Sept. 8, 1954 4 Sheets-Sheet 4
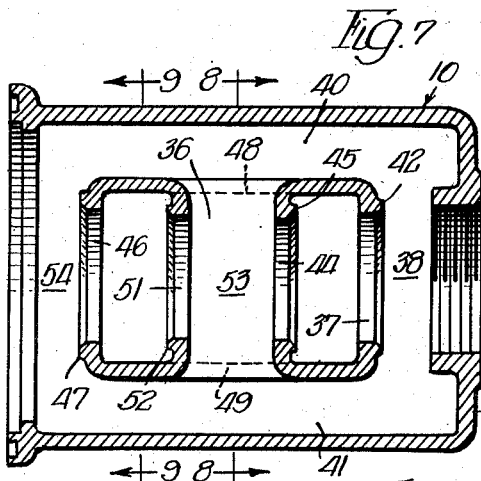
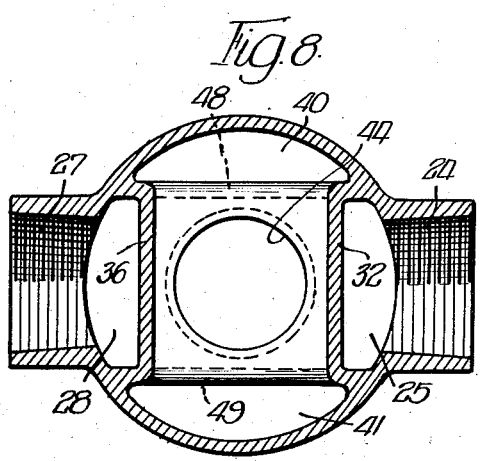
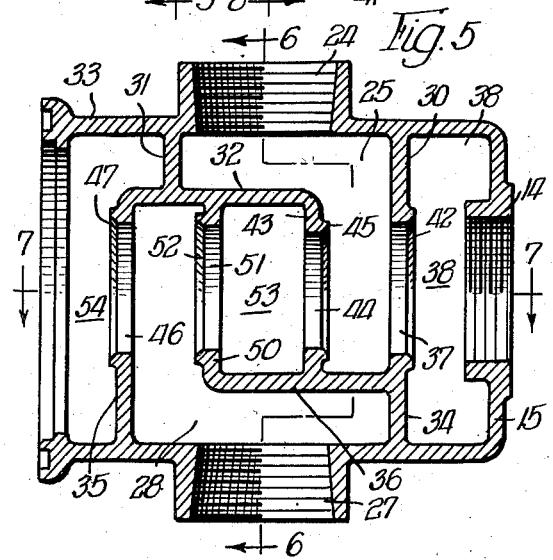
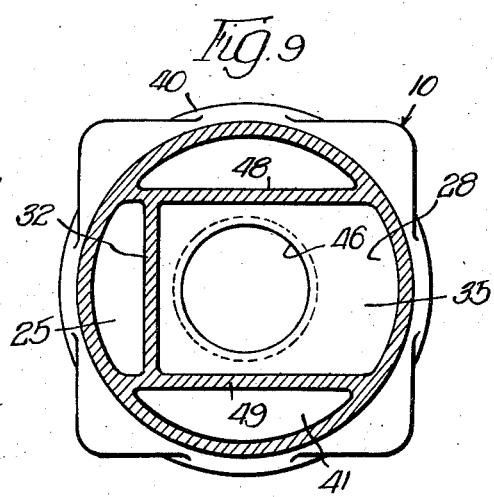
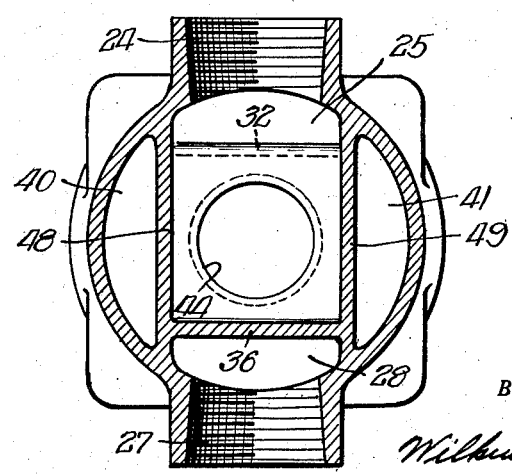
INVENTORS.
Joseph E. Panza,
BY David H. Thorburn,

United States Patent Office 2,828,075
Patented Mar. 25, 1958

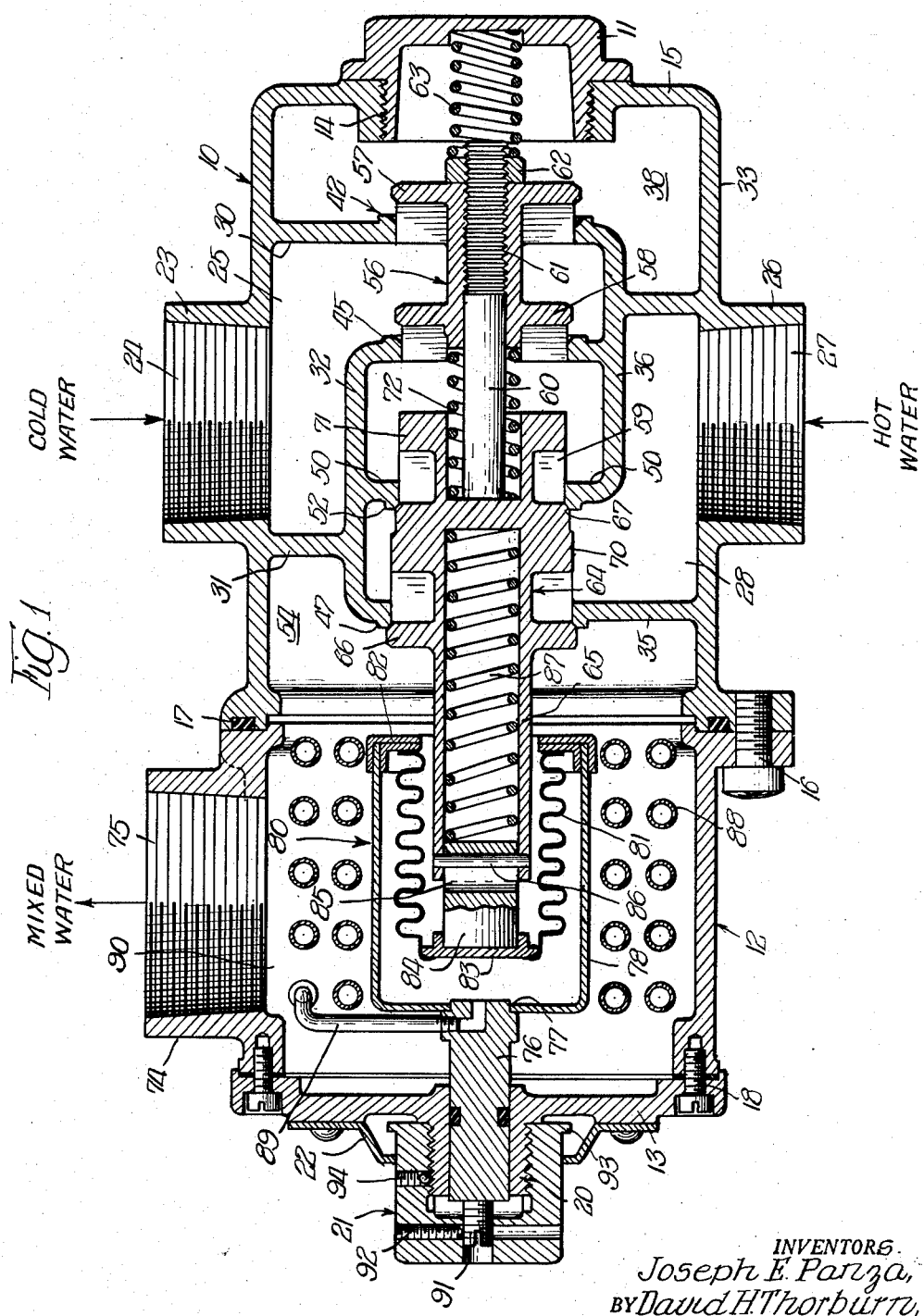

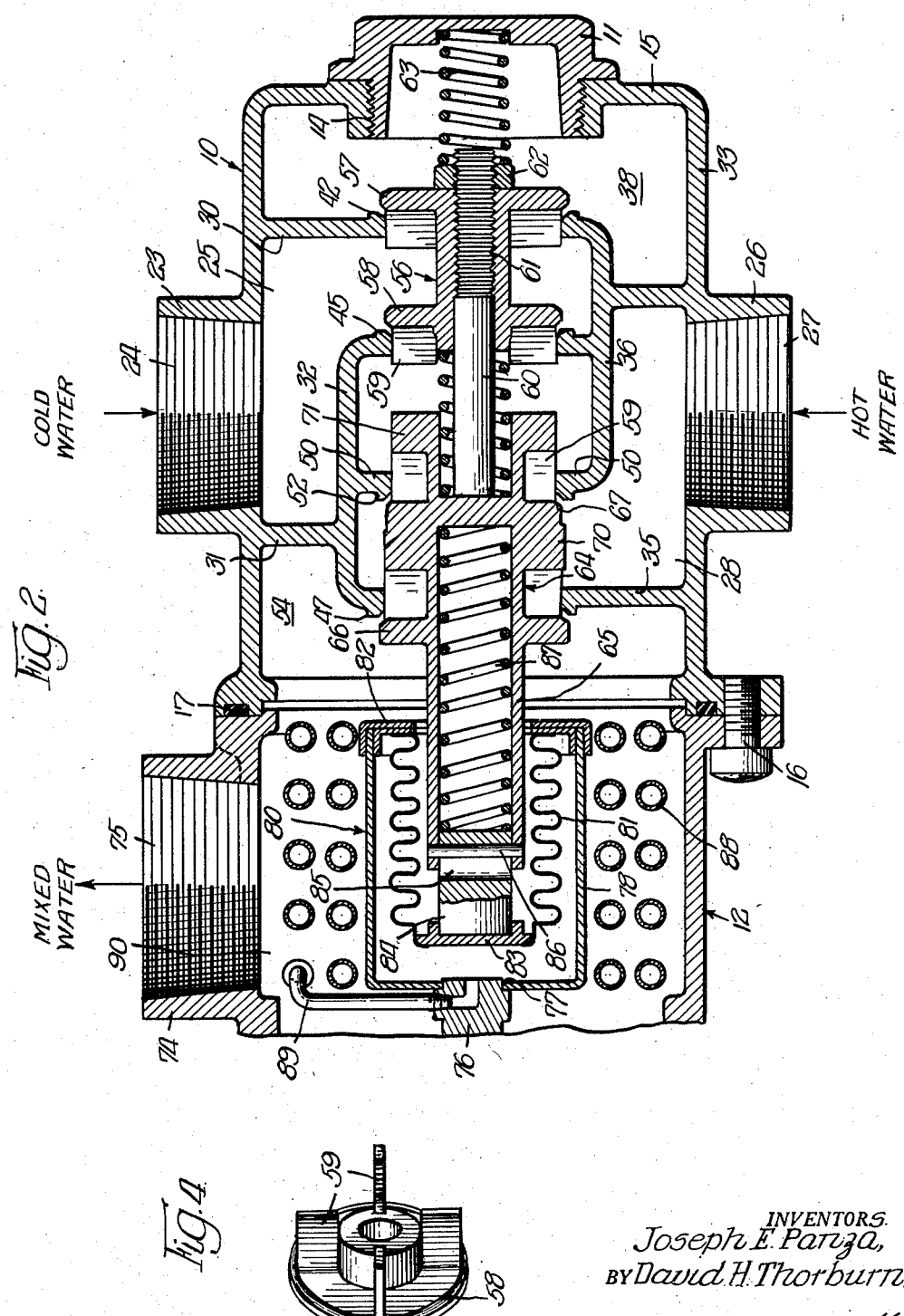

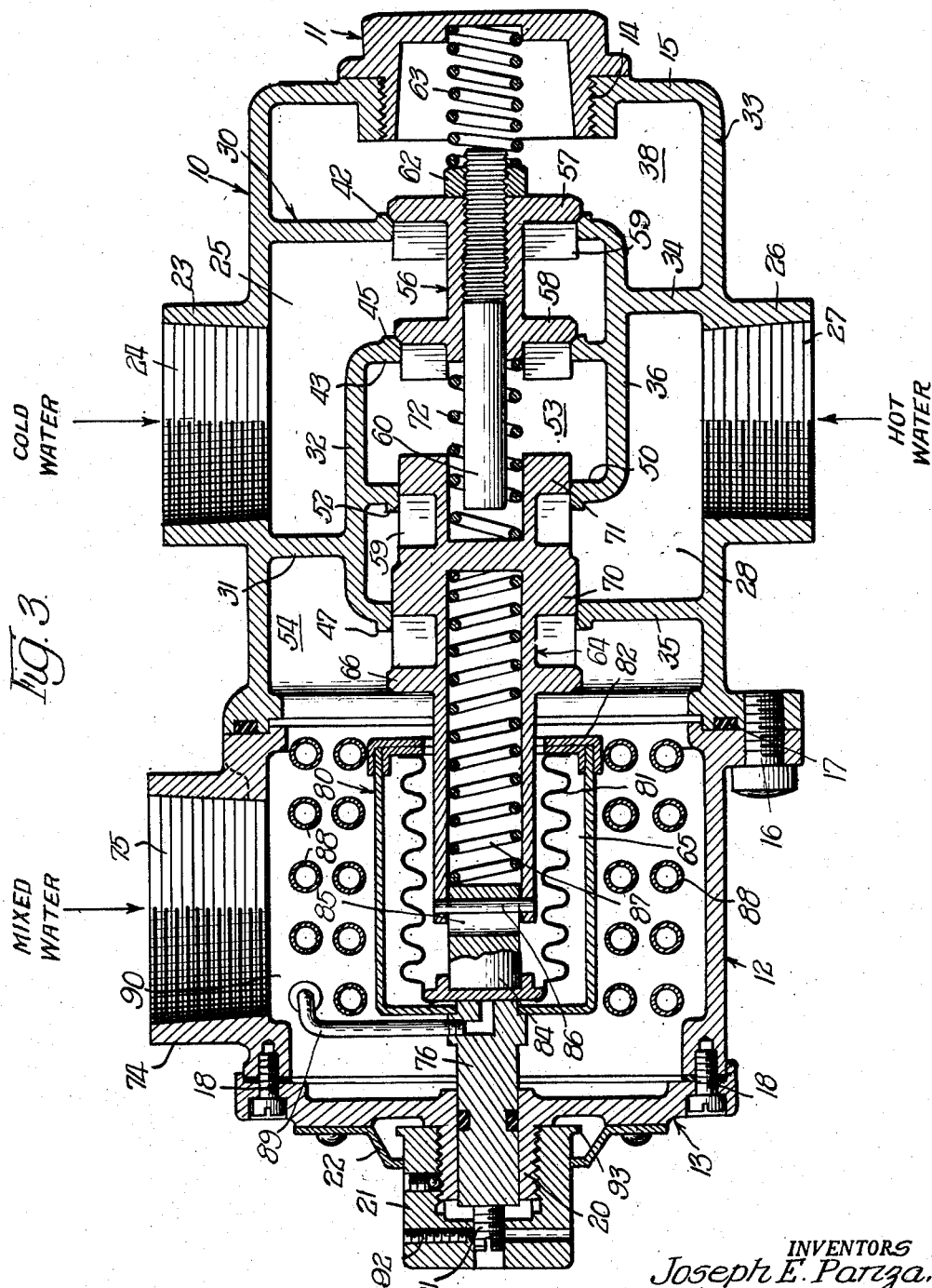

2,828,075

SAFETY MIXING VALVE FOR HOT AND COLD WATER

Joseph E. Panza, Arlington Heights, and David H. Thorburn, Oak Park, Ill., assignors to The Powers Regulator Company, Skokie, Ill., a corporation of Illinois Application September 8, 1954, Serial No. 454,806

10 Claims. (Cl. 236—12)

The invention relates to a mixer for hot and cold liquids and has reference in particular to a mixer type valve having not only the conventional hot water shut-off upon cold water failure and cold water shut-off upon hot water failure, but also having both hot and cold water shut-off upon thermostatic motor failure.

A general object of the invention resides in the provision of a controller in the form of a mixer type valve for mixing hot and cold liquids such as water to a predetermined temperature.

A more specific object is to provide such a device which will thoroughly mix the hot and cold liquids before flowing the same over the thermostatic motor on its way to the outlet. As a result the motor is more accurately responsive to the temperature of the mixed liquids and due to this accuracy the valve will operate to maintain a substantially constant temperature for the mixed liquids regardless of fluctuations of temperature or pressure on the hot and cold inlet lines.

In connection with the foregoing, another object resides in the provision of a mixer type valve which will incorporate a premixing chamber in addition to the conventional or regular mixing chamber, and wherein the liquid from said premixing chamber is delivered to the regular mixing chamber together with some hot and cold liquids to be additionally mixed therewith.

Another object is to provide a water controller of the type described which will have a poppet valve for the cold water and a poppet valve for the hot water, both of which deliver into the regular mixing chamber, and which will also have another pair of such valves for the hot and cold water, respectively, constructed and operating to deliver into the premixing chamber.

A further object of the invention is to provide a new design of water controller having one valve unit providing a pair of poppet valves for the cold water and having a second valve unit, separate and independent of the first, which, in addition to providing the poppet valves for the hot water has formed integral therewith a pair of safety sleeve valves which when rendered operative close off the hot water ports.

Another object is to provide a water controller as described wherein the poppet valves for the cold water are seated by a return spring, wherein the poppet valves for the hot water are seated by the thermostatic motor, and wherein a safety spring is provided having location between the first and the second valve unit and which upon motor failure will move the sleeve valves into the hot water ports whereby to close off flow of said hot water.

Another object is to provide a device of the character described which will mix hot and cold water and which will control the temperature of the mixture so as to maintain the same substantially constant for any particular setting of the device, and wherein said device will embody a lost motion connection in combination with a coil spring for permitting additional contraction of the thermostatic motor after the poppet valves for the hot water have seated.

With these and various other objects in view, the invention may consist of certain novel features of construction and operation as will be more fully described and particularly pointed out in the specification, drawings and claims appended thereto.

In the drawings which illustrate an embodiment of the invention, and wherein like reference characters are used to designate like parts—

Figure 1 is a longitudinal sectional view of a thermostatic water controller embodying the improved features of the invention, the device being shown with the poppet valves for the hot water in closed position and with the poppet valves for the cold water in open position;

Figure 2 is a longitudinal sectional view similar to Figure 1 but showing the water controller with the poppet valves for both hot and cold water in open position;

Figure 3 is a longitudinal sectional view also similar to Figure 1 but showing the position of the several valve units in the event of failure of the thermostatic motor;

Figure 4 is a fragmentary perspective view of one of the poppet valves for the cold water, the same illustrating the radially extending guiding flanges which are formed integral with each valve;

Figure 5 is a sectional view taken longitudinally through the valve housing of the water controller showing the ports for the hot and cold water;

Figure 6 is a transverse sectional view taken substantially along line 6—6 of Figure 5;

Figure 7 is a longitudinal sectional view taken substantially along line 7—7 of Figure 5;

Figure 8 is a transverse sectional view taken substantially along line 8—8 of Figure 7; and Figure 9 is a transverse sectional view taken substantially along line 9—9 of Figure 7.

The embodiment of the invention selected for illustration in the drawings essentially consists of a metal enclosure or casing comprising four main parts, namely, a valve housing 10, an end closure nut 11, a motor housing 12, and an end plate 13. The nut 11 is threaded at 14 to the end wall 15 of the valve housing. The said valve housing is suitably secured to the motor housing as by means of the securing bolts 16, the joint between the parts being sealed by packing 17 to thus prevent the escape of fluid from the casing. The end plate 13 is releasably fixed to the motor housing by the metal screws 18. The plate has formed centrally thereof the threaded boss 20 on which is threadedly mounted the temperature adjusting member 21, and said plate 13 has fixedly secured thereto the metal disc 22 which functions as a maximum temperature limiting stop. The function of the member 21 and stop 22 will be explained in detail as the description proceeds. The thermostatic motor of the present mixer is of course located within the motor housing 12, whereas the valve housing 10 is provided with ports for hot and cold water, respectively, and valve units are associated with said ports, the same having location within the housing and which are adapted to be moved by the motor for opening and closing said ports.

The boss 23 projecting from the exterior of the valve housing 10 provides the cold water inlet 24 which leads to the compartment 25 within the housing. In a similar manner the boss 26 provides the hot water inlet 27 which leads to the compartment 28 within the housing and which is disposed diametrically opposite the cold water compartment 25. This latter compartment is formed in part by transverse walls 30 and 31 and by the longitudinal wall 32, this latter wall extending from one side of the housing to the opposite side and being integral at each side with the outer cylindrical wall 33 of the housing, and with walls 48 and 49, Figure 6. For compartment 28 the formation is similar, the same being formed by transverse walls 34 and 35 in combination with the longitudinal wall 36. The wall 36 extends from side to side of the housing, being formed integral at each side with the cylindrical wall 33 thereof, and with walls 48 and 49. The transverse wall 30 provides a cold water port 37, Figure 5, so that the cold water from compartment 25 flowing through the port 37 is delivered into the end compartment 38 which communicates with the cold water channels 40 and 41, Figure 7. The bevelled valve seat 42 surrounds the port 37. The transverse wall 43, which connects with 32 and 36, provides the second cold water port identified by numeral 44 and the valve seat 45 has surrounding relation with said port on the side of compartment 25. The transverse wall 35 is provided with a hot water port 46 and said wall is additionally provided with the valve seat 47, having surrounding relation with said port. The transverse wall 50, which is similar to wall 43, has connecting relation with walls 36 and 32. Said wall 50 provides a hot water port 51 and on the side of the compartment 28 the said wall is provided with the valve seat 52. The walls 48 and 49, which form the longitudinal channels 40 and 41 for the cold water, complete the system of compartments, channels and chambers within the valve housing.

From the foregoing, it will be understood that compartment 25 provides an entrance compartment for the cold water, whereas compartment 28 initially receives the hot water. The arrangement of transverse and longitudinal walls provides a pair of ports, namely, 37 and 44, for the cold water, and a pair of ports, namely, 46 and 51, for the hot water. Also the arrangement is such that the transverse walls 43 and 50 in combination with the longitudinal walls 32 and 36 form a premixing chamber designated by numeral 53, said chamber having communication through port 44 with the cold water compartment 25 and said chamber likewise having communication through port 51 with the hot water compartment 28. The end compartment 38 at the right hand end of the housing also has communication through port 37 with the cold water compartment 25 and the left hand end compartment 54 of the said valve housing in a similar manner has communication through port 46 with the hot water compartment 28. During operation, the cold water from the end compartment 38 is delivered by means of the cold water channels 40 and 41 to compartment 54. Likewise the liquid from the premixing chamber 53 is delivered to compartment 54 since the premixing chamber has communicating relation with channels 40 and 41, see Figure 7. It will be observed that hot water from compartment 28 by flowing through port 46 will likewise be delivered to compartment 54.

The valve means having location within the valve housing 10, and which are operatively associated with the ports as described, essentially consist of a valve unit 56 providing as an integral part thereof the poppet valves 57 and 58, each poppet valve having a bevelled periphery for coaction with its respective bevelled valve seat and each poppet valve also having formed integral therewith on the rear surface thereof a plurality of radially extending guiding flanges 59, see Figure 4. The valve unit 56 is interiorly threaded for part of its length for receiving the stud 60 which is threaded thereto, as at 61, and locked in adjusted position longitudinally of the unit by means of the securing nut 62. The coil spring 63 functions as a return spring for the valve unit 56 since the spring yieldingly biases the unit in a direction toward the left whereby to seat the poppet valves 57 and 58 on their seats 42 and 45. The spring 63 seats against the end closure nut 11 and has contact at its other end with the nut 62.

Whereas the valve unit 56 is associated with the cold water ports, the second valve unit 64 has association with the hot water ports. Said unit includes the hollow stem 65 which extends in a direction toward the left some distance into the motor housing 12. A pair of poppet valves, identified by numerals 66 and 67, are provided by the second valve unit, the said poppet valves having a bevelled periphery for coaction with the bevelled valve seats 47 and 52, respectively. However, this second valve unit is radically different in its structural makeup from the first unit since sleeve valves are provided by the second unit, the same being formed as an integral part of the unit and having a unique arrangement with the poppet valves thereof. For example, the sleeve valve, identified by numeral 70, is formed as an integral part of both the poppet valves 66 and 67, being located therebetween, and the sleeve valve 70 has a diameter of a size permitting it to enter the hot water port 46 for the purpose of closing off said port in the event of motor failure. The sleeve valve 71 is formed integral with poppet valve 67, being located to the right thereof, and valve 71 has a diameter of a size permitting it to enter the hot water port 51 whereby to close off and said port in the event of motor failure. Stud 60 has an adjusted length for properly spacing the valve units 56 and 64, as will be clearly understood by reference to Figure 1, and the safety coil spring 72 has surrounding relation with stud 60, the coil spring having contact at its right hand end with valve unit 56 and at its left hand end with valve unit 64.

The motor housing 12 is substantially cylindrical, having the boss 74 formed integral therewith on one side of the housing, the same providing the outlet 75 for the mixed or tempered liquid produced by the present device. As previously explained, the end plate 13 is releasably secured to the motor housing by the metal screws 18 and the threaded boss 20 provided by the member is centrally cored for receiving the motor supporting shaft 76. The inner end of said shaft is reduced in diameter as at 77 to form a shoulder to which the cup-shaped member 78 is secured. Said member forms the housing for the thermostatic motor designated in its entirety by numeral 80. The bellows 81 is located within housing 78 and is sealed at its open right hand end to the end discs 82. The left hand end of the bellows is closed, and said end is suitably reinforced by the thrust plate 83.

In accordance with the invention the stud 84 is fixedly secured to the thrust plate 83 so as to extend within the bellows and said stud is provided with the slot 85. The slotted end of stud 84 is received within the hollow stem 65 of the second valve unit 64 and by means of the pin 86 and coil spring 87 a lost motion connection is provided which permits continued contraction of the bellows, with corresponding movement of the stud 84 to the right, after the poppet valves 66 and 67 have seated. The thermostatic motor is completed by the tubing 88 having a coiled relation around the exterior of the motor housing 78 and which is connected to the interior of the motor housing by the capillary tube 89. The interior of the motor housing, that is, the space between the bellows and the housing 78, including also the surrounding tube 88, are filled with a thermostatic fluid such as ethyl ether, alcohol, or the like, and it will be observed that the motor and tubing are located within chamber 90 having communicating relation with compartment 54, the same providing the regular mixing chamber of the valve. Thus, the mixed liquids such as the hot and cold water from the inlets 24 and 27 are caused to flow over and come in contact with the housing and tubing of the thermostatic motor on their way to outlet 75. When the thermostatic fluid within the motor is caused to expand by the high temperature of the mixed liquid flowing toward the outlet 75, the effect of said expansion is to contract the bellows and accordingly the stud 84 and valve units 64 and 56 are caused to move to the right so that the poppet valves 66 and 67 will reduce and in some cases completely close off flow of hot water through the ports 46 and 51, whereas the cold water poppet valves 53 and 57 are opened to a greater extent. Conversely, when the temperature of the mixed liquid flowing toward outlet 75 is cold or relatively cool, the effect is to contract the thermostatic fluid within the motor, which allows the bellows to expand. Expanding action of the bellows will move stud 84 to the left and accordingly the valve units 64 and 56 will be moved in a direction toward the left, with the result that the poppet valves 66 and 67 move away from their seats, permitting increased flow of hot water through the ports 46 and 51. However, the cold water poppet valves close to decrease the flow of cold water.

The temperature adjusting member 21 has threaded relation on the threaded exterior of boss 20 and the member retains an adjusting screw 91, the same being centrally located in the end wall of the member and being held in adjusted position by the set screw 92. It will be seen that the adjusting screw 91 has contact with the end of the motor supporting shaft 76 and thus the thermostatic motor is positioned within housing 12, either forwardly of the housing, that is, toward the right, or rearwardly toward the left, depending on the particular positioning of the temperature adjusting member 21 on the boss 20. As shown in Figure 1, the member has been threaded on the boss to the limit of its right hand position, which thus locates the thermostatic motor in its extreme forward position. As a result the mixer valve is adjusted for its lowest temperature as regards the mixed liquid discharged from outlet 75. When the temperature adjusting member 21 is rotated on the boss 20 to the limit of its left hand position, that is, where flange 93 will contact the disc 22, the thermostatic motor will be accordingly positioned to the limit of its rearward movement within the motor housing and thus the mixer valve will be adjusted for the maximum temperature as regards the mixed liquid. The ball and set screw arrangement indicated by numeral 94 enables the member 21 to be locked in any adjusted location between its high and low temperature positions.

The return spring 63 yieldingly biases the cold water valves 57 and 58 toward their valve seats and thus said valves are moved into open position by the action of the thermostatic motor and which action thus takes place through the member 60 and against the tension of return spring 63. It will also be observed that action of the thermostatic motor for closing the hot water valves and for opening the cold water valves is in a direction to compress coil spring 87. Coil spring 63 is therefore the weaker of the two springs, since, if this were not the case, the contracting action of the bellows would be nullified by the lost motion connection formed by the slot 85 and the pin 86. Another important structural feature resides in the fact that the coil spring 72 is weaker than the return spring 63. This is necessary in order to allow the return spring to produce movement of the cold water valves in a seating direction. However, under all circumstances the coil spring 72 will act as a safety spring in the event the thermostatic motor should fail for any reason, such as leakage of the thermostatic fluid therefrom. When this takes place, see Figure 3, the coil spring 72 effects movement of the second valve unit in a direction toward the left and as a result of this movement sleeves 70 and 71 are caused to enter their respective hot water ports to close off the ports, thus terminating the flow of hot water. The flow of cold water is of course terminated by the return spring 63 which forces hte valves 57 and 58 into contact with their respective valve seats.

The premixing chamber 53 is an important feature of the present device. A proportioned quantity of hot and cold liquid will flow into the premixing chamber and this premixed liquid upon entering the channels 40 and 41 will combine with the cold water from compartment 38. The mixture is further combined with hot water which enters the compartment 54 directly through the port 46. Accordingly, thorough mixing of the hot and cold liquids is effected before the mixture comes into contact with the thermostatic motor and the motor is thus more accurately responsive so that a constant temperature for the mixed liquid is obtained for any particular setting of the temperature control member.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a mixer valve, a cylindrical casing including a valve housing and a motor housing, the valve housing having hot and cold water inlets and the motor housing having a mixed water outlet, said valve housing having a plurality of transverse and longitudinal walls dividing the interior thereof into compartments connecting with the hot and cold water inlets respectively, into cold water channels located on respective sides of the housing and into a premixing chamber having communication with said channels, certain of said transverse walls providing cold water ports connecting the cold water compartment with the channels and premixing chamber respectively, certain other transverse walls providing hot water ports connecting the hot water compartment with the channels and premixing chamber respectively, whereby the channels will conduct liquid from both the cold and hot water compartments and also from the premixing chamber, valve means in association with said ports and operative to close and open the ports upon movement of the valve means, a thermostatic motor located within the motor housing, means connecting the valve means with said thermostatic motor whereby the valve means will have movement in response to actuation by the thermostatic motor, and said valve means including a first valve unit providing a pair of poppet valves for the cold water ports, and a second valve unit providing a pair of poppet valves for the hot water ports, said second unit also providing a pair of sleeve valves formed integral with the poppet valves thereof and which are adapted to enter their respective ports to close the ports in the event of failure of the thermostatic motor.

2. In a water controller of the thermostatic type, a housing having hot and cold water inlets and a mixed liquid outlet, a mixing chamber within the housing in communication with the outlet, a thermostatic motor in supported relation within the mixing chamber, a cold water compartment and a hot water compartment within the housing and having communication with the cold and hot water inlets respectively, a cold water channel extending longitudinally of the housing and discharging into the mixing chamber, a premixing chamber having connection with the cold water channel intermediate its length, a pair of cold water ports for connecting the cold water compartment with the channel and premixing chamber respectively, a pair of hot water ports for connecting the hot water compartment with the channel and premixing chamber respectively, valve means for said ports including a first valve unit providing poppet valves for the cold water ports and a second valve unit providing poppet valves for the hot water ports, a coil spring for biasing the first valve unit in a direction to seat the poppet valves thereof, means connecting the second valve unit with the thermostatic motor, and a stud member located between the valve units and fixed to one of them for maintaining the poppet valves for the cold and hot water ports in proper spaced relation.

3. A water controller as defined by claim 2, additionally including a pair of sleeve valves forming part of the second valve unit and which are normally positioned for entering the hot water ports to close said ports, and a safety coil spring located between the valve units and having surrounding relation with the stud member, said safety coil spring being operative in the event of failure of the thermostatic motor to move the second valve unit to cause the sleeve valves to enter the hot water ports.

4. A water controller as defined by claim 2, additionally including a pair of sleeve valves formed integral with the poppet valves of the second valve unit and which are adapted to enter the hot water ports to close the ports, a safety coil spring located between the valve units and having surrounding relation with the stud member, said safety coil spring being operative in the event of failure of the thermostatic motor to move the second valve unit to cause the sleeve valves to enter the hot water ports, and wherein the means connecting the second valve unit with the thermostatic motor includes a lost motion connection which permits continued contraction of the motor after the poppet valves of the second valve unit have seated.

5. In a water controller of the thermostatic type, a housing having hot and cold water inlets and a mixed liquid outlet, a mixing chamber within the housing in communication with the outlet, a thermostatic motor in supported relation within the mixing chamber, a premixing chamber formed interiorly of the housing in spaced relation with the mixing chamber, said housing also having a cold water channel extending longitudinally thereof, said channel having communication with the premixing chamber and discharging into the mixing chamber, a pair of spaced ports connecting the cold water inlet with the channel and premixing chamber respectively, a pair of spaced ports connecting the hot water inlet with the channel and premixing chamber respectively, a first valve unit providing poppet valves for the cold water ports, a coil spring for yieldingly biasing the first valve unit in a direction to cause the poppet valves to seat, a second independent valve unit providing poppet valves for the hot water ports and which are so constructed and arranged as to seat when moved in a direction opposite to that which effects seating of the cold water poppet valves, means connecting the motor with the second valve unit, whereby the hot water ports are closed and opened by movement of their poppet valves due to actuation of the second valve unit by the motor, and a stud member located between the first and second valve units and fixed to only one of them for maintaining the valve units in proper spaced relation.

6. A water controller of the thermostatic type as defined by claim 5, wherein the means connecting the motor with the second valve unit includes a lost motion connection which permits the motor to continue its movement in a closing direction after the hot water poppet valves have seated, and additionally including a pair of sleeve valves forming part of the second valve unit and which are adapted to enter the hot water ports to close the same, and a safety coil spring located between the valve units and having surrounding relation with the stud member, said safety coil spring effecting movement of the second valve unit to cause the sleeve valves thereof to close the hot water ports in the event the thermostatic motor should fail.

7. In a water controller of the thermostatic type, a housing having hot and cold water inlets and a mixed liquid outlet, a mixing chamber within the housing in communication with the outlet, a thermostatic motor in supported relation within the mixing chamber, a hot water compartment within the housing in communication with the hot water inlet, a cold water compartment also within the housing in communication with the cold water inlet, a premixing chamber located between the compartments and having associated relation with both compartments and which discharges into the mixing chamber, a pair of hot water ports for connecting the hot water compartment with the premixing and mixing chambers respectively, a pair of cold water ports for connecting the cold water compartment with the premixing and mixing chambers respectively, valve means for closing and opening said ports, said valve means including a first valve unit providing a pair of poppet valves for the cold water ports, said valve means additionally including a second valve unit separable from the first valve unit and also providing a pair of poppet valves for the hot water ports, said last mentioned poppet valves having sleeve valves respectively formed integrally therewith and which are adapted to enter said hot water ports, a stud member located between the first and second valve units for maintaining the valve units in spaced relation, means connecting the said valve means with the thermostatic motor, and said means including a lost motion connection which permits continued contraction of the motor after the poppet valves for the hot water ports have seated.

8. In a water controller of the thermostatic type, a housing having hot and cold water inlets and a mixed liquid outlet, a mixing chamber within the housing in communication with the outlet, a thermostatic motor in supported relation within the mixing chamber, a hot water compartment within the housing in communication with the hot water inlet, a cold water compartment also within the housing in communication with the cold water inlet, a premixing chamber located between the compartments and having associated relation with both compartments and which discharges into the mixing chamber, a pair of hot water ports for connecting the hot water compartment with the premixing and mixing chambers respectively, a pair of cold water ports for connecting the cold water compartment with the premixing and mixing chambers respectively, valve means for closing and opening said ports, said valve means including a first valve unit providing a pair of poppet valves for the cold water ports, said valve means additionally including a second valve unit separable from the first valve unit and also providing a pair of poppet valves for the hot water ports, said last mentioned poppet valves having sleeve valves respectively formed integrally therewith and which are adapted to enter said hot water ports, a stud member located between the first and second valve units for maintaining the valve units in spaced relation, means connecting the second valve unit with the thermostatic motor, a coil spring confined between the housing and the first valve unit for biasing the poppet valves thereof in a direction to seat the valves, and a safety coil spring located between the valve units, said safety coil spring effecting movement of the second valve unit to cause the sleeve valves thereof to enter and close the hot water ports in the event the thermostatic motor should fail.

9. In a water controller of the thermostatic type, a housing having hot and cold water inlets and a mixed liquid outlet, a mixing chamber within the housing in communication with the outlet, a thermostatic motor within the mixing chamber, a hot water compartment within the housing in communication with the hot water inlet, a cold water compartment within the housing in communication with the cold water inlet, a premixing chamber located between and having associated relation with both compartments and which discharges into the mixing chamber, a pair of hot water ports for connecting the hot water compartment with the premixing and mixing chambers respectively, a pair of cold water ports for connecting the cold water compartment with the premixing and mixing chambers respectively, valve means providing a poppet valve for each port for closing and opening said ports as the valve means is moved in an axial direction, said poppet valves and ports being so constructed and arranged that the poppet valves for the cold water ports are closed by movement of the valve means in one direction and the poppet valves for the hot water ports are closed by movement of said valve means in an opposite direction, means connecting the said valve means with said thermostatic motor, said connecting means including a lost motion connection and a coil spring in associated relation therewith, whereby any lost motion as regards the connection takes place by compressing the coil spring and which thereby permits the thermostatic motor to continue its movement in a closing direction after the hot water poppet valves have seated, and a second coil spring located between the housing and the cold water poppet valves for biasing the said poppet valves in a direction to close, said first mentioned coil spring exerting a resilient force greater than that exerted by the second coil spring.

10. In a water controller of the thermostatic type, a housing having hot and cold water inlets and a mixed liquid outlet, a mixing chamber within the housing in communication with the outlet, a thermostatic motor within the mixing chamber, a hot water compartment within the housing in communication with the hot water inlet, a cold water compartment within the housing in communication with the cold water inlet, a premixing chamber located between and having associated relation with both compartments and which discharges into the mixing chamber, a pair of hot water ports for connecting the hot water compartment with the premixing and mixing chambers respectively, a pair of cold water ports for connecting the cold water compartment with the premixing and mixing chambers respectively, valve means providing a poppet valve for each port for closing and opening said ports as the valve means is moved in an axial direction, said valve means including a first valve unit providing the poppet valves for the cold water ports and a second valve unit providing the poppet valves for the hot water ports, said second valve unit additionally including a pair of sleeve valves and which are adapted to enter and close the hot water ports in the event the thermostatic motor should fail, means connecting the said valve means with the thermostatic motor, said connecting means including a lost motion connection constructed and arranged to permit the thermostatic motor to continue its movement in a closing direction after the hot water poppet valves have seated, and supporting means slidably mounted by the housing for supporting the thermostatic motor in a manner permitting limited adjustment of the motor in a direction axially of said valve means.

References Cited in the file of this patent

UNITED STATES PATENTS

| | | |
|---|---|---|
| 1,208,130 | Fulton | Dec. 12, 1916 |
| 1,752,116 | Smith | Mar. 25, 1930 |
| 1,920,458 | Bast | Aug. 1, 1933 |
| 1,931,896 | Henning | Oct. 24, 1933 |
| 2,141,520 | Dube | Dec. 27, 1938 |
| 2,382,283 | Barnett | Aug. 14, 1945 |
| 2,584,420 | Branson | Feb. 5, 1952 |